United States Patent Office 3,155,939
Patented Nov. 3, 1964

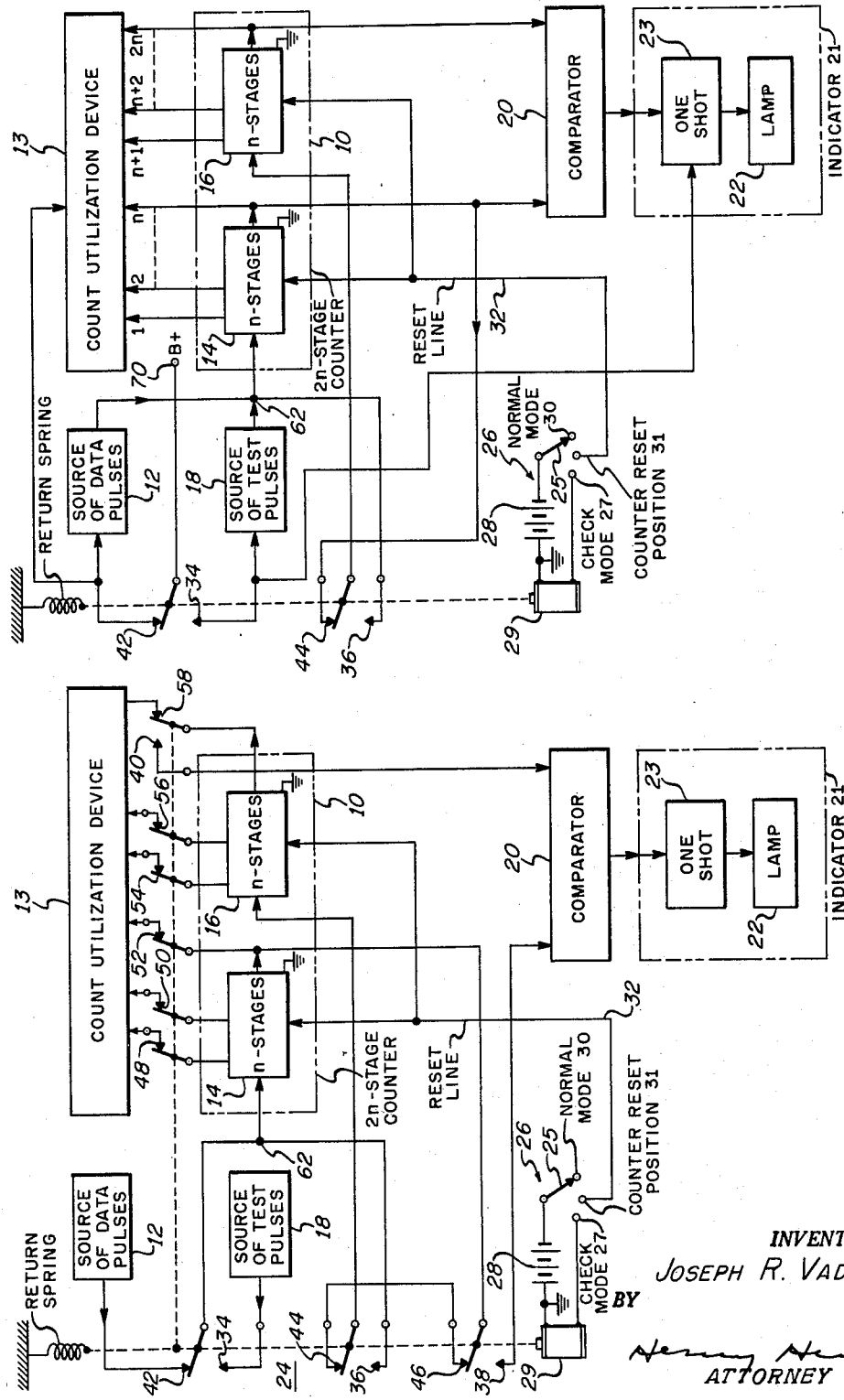

3,155,939
COUNTER CHECKING CIRCUIT
Joseph R. Vadus, Carle Place, N.Y., assignor to Sperry Rand Corporation, Great Neck, N.Y., a corporation of Delaware
Filed Oct. 31, 1960, Ser. No. 66,358
11 Claims. (Cl. 340—146.1)

This invention relates to a counter checking circuit, and more particularly to a self-checking binary counter circuit.

In some circuits employing counters, it is necessary to check the accuracy of the counters at frequent intervals. Prior proposed techniques and apparatus for this purpose have been unduly complex and expensive. For example, in one method of checking a binary counter, a predetermined number of pulses are injected into the counter, after which the count in the counter is read out to determine whether it is the same as the known number of pulses injected. A drawback of this type of check is the expense of apparatus for generating an exact number of pulses.

In accordance with one embodiment of the present invention, a counter, employed in a system utilizing the count of information or data pulses, is self-checked by an arrangement including a dual-mode switch which in one mode connects the counter for normal operation in a utilization circuit, and in the other mode rearranges the counter into two equal sections whose inputs are connected to the same pulse source and whose outputs are applied to a comparator which provides an indication when the counter outputs are unequal, thereby indicating error or malfunction in the counters.

It is therefore an object of the present invention to provide a self-checking counter arrangement.

Other objects include simple and economical arrangements for checking the performance of counters that are integrated into systems.

Other and further objects and advantages of the present invention will be apparent from the following description, reference being had to the accompanying drawings wherein preferred forms of the present invention are clearly shown.

In the drawings;

FIG. 1 is a diagram (part block-part schematic) of one embodiment of the invention, FIG. 2 is a diagram of a modification of FIG. 1 showing alternative techniques for switching components in and out of the circuit.

The apparatus shown in FIG. 1 is a system which, in a normal mode of operation, utilizes specific counts of data pulses received by a $2n$-stage digital counter 10 from a source 12 of data (information) pulses for controlling a utilization circuit 13 responsive to the count in the counter. The system is also operable in a check mode of operation for checking the counter 10, in which mode counter 10 is rearranged into two equal $n$-stage sections 14 and 16 whose inputs are connected to a source 18 of test pulses and whose $n$th stage outputs are applied to a comparator 20 which provides a distinctive output when the $n$th stage outputs of the counter sections are unequal, thereby indicating malfunction or error in a counter section.

Athough not restricted thereto, the counter 10 may be a $2n$-stage binary counter, and the counter sections 14 and 16 may each include $n$ stages ($n=1$ or more), and each stage may be a trigger-type flip-flop, for example, a bistable multivibrator. Flip-flops are well-known and need no further description.

The source 12 of information or data pulses may be a transducer, a converter, a translator, or any other generator or receiver of digital information pulses, for example a tape reading system. The count utilization device 13 may, for example, be the input relays of a code translating matrix or relay tree. Source 18 may be a blocking oscillator or the master clock of a computer or any other suitable source of repetitive pulses.

The comparator 20 may be of any suitable type which provides a distinctive output when unlike signals, such as a binary 1 and a binary 0, are applied to its respective input terminals. For example, the comparator 20 may be an Exclusive-Or circuit, having the Boolean logic $A\bar{B}+\bar{A}B$, which provides an output binary 1 only in response to unlike signals at its two inputs, i.e. binary 1 at either input and binary 0 at the other input. The comparator 20 may have its own output indicator, or its output may be applied to a suitable indicator 21, for example, a lamp 22 and associated driver circuits therefor, which may include a one-shot 23 such as a monostable multivibrator with a sufficiently long time-constant to allow perception of the lamp in case of error in the counter. The arrangement is such that the lamp is driven by the one-shot only in response to unlike signals at the respective inputs of the comparator.

The modes of operation are selected by a relay 24 which, when unenergized (released), interconnects the components into the circuit configuration that provides the normal mode of operation. This is the configuration shown in the drawing. When energized (operated), relay 24 rearranges the connections of the circuit components to provide a circuit configuration for the check mode of operation. Relay 24 is energized by moving the blade 25 of a three position switch 26 to the check mode tap 27 to connect the battery 28 to the operating winding 29 of relay 24. As the blade 25 is moved from the normal mode position 30 to the check mode tap 27, it momentarily contacts counter reset tap 31 thereby applying battery voltage via a line 32 to the reset terminals of the counter sections 14 and 16, thus resetting the sections to a pre-set count such as 0 preparatory to the checking operation.

Relay 24 includes normally open contacts 34, 36, 38 and 40, which are closed when the relay is operated, and open when the relay is released. The relay also includes normally closed contacts 42, 44, 46, 48, 50, 52, 54, 56 and 58, which are opened when the relay is operated, and closed when the relay is unoperated.

The input of counter section 14 is connected to an input terminal 62, which in turn is connected through contact 42 to the source 12 of data pulses during the normal mode of operation, and is connected through contact 34 to the source 18 of test pulses during the check mode of operation. In the normal mode, the $n$th-stage output of counter section 14 is connected to the input of counter section 16 through contacts 46 and 44, thus connecting sections 14 and 16 in cascade to form the $2n$-stage counter 10. Also in the normal mode the inputs of the count utilization device 13 are connected to respective stages of the counter 10 through closed contacts 48, 50, 52, 54, 56 and 58, which contacts are opened during the check mode to disconnect the device 13 from the counter 10.

During the check mode, the series connection between counter sections 14 and 16 is broken, and input terminal 62 is connected to the input of counter section 16 through contact 36. Also during the check mode the $n$th stage output of counter 14 is connected through contact 38 to an input of comparator 20 whose other input is connected to the $n$th stage output of counter section 16 through contact 40. Thus, during the check mode the series connection between counter sections 14 and 16 is broken and the inputs of the two sections are connected together at the input terminal 62, which in turn is connected to the source of test pulses 18.

During the check mode, the comparator 20 receives at its respective input terminals, signals from the $n$th stage outputs of the counter sections 14 and 16. The $n$th stage outputs of the respective counter sections 14 and 16, being the outputs of like capacity sections of the counter, should provide the same or equal output signals in response to the test pulses from source 18 applied to the respective inputs of the counter section 14 and 16 through input terminal 62.

If each stage of each counter section is operating properly, the outputs of the last stage of each counter section will be identical, thus resulting in no output from the comparator. For example, if the counter is a binary counter and each section has 4 stages ($n=4$), then the like capacity output (4th stage) of each section should provide a binary 1 in response to the receipt of the 16th of a series or pulses received at the respective inputs of counter sections 16 and 18 through input terminal 62 from the test pulse source 18. In such case, the comparator 20 would receive equal or like signals, at its respective input terminals and provide no output. However, if any stage is not operating properly, the last stages of the respective counter sections will transfer a binary 1 at different times thus applying unequal signals (binary 1 and binary 0) to the respective inputs of the comparator 20, thus resulting in an output from the comparator and an error indication by indicator 22.

In the check mode, equal counter sections are compared, and the number of pulses fed to the inputs of the respective sections being compared should at least equal the capacity of each section being checked, i.e., the number of pulses should be sufficient to overflow the sections under test. For example, where the equal sections each consist of four binary stages, sixteen pulses or a count of sixteen is required to produce a binary 1 output at the 4th stage of each section, thus at least sixteen pulses are required when checking four-stage sections.

Alternatively, various components, such as the pulse sources 12 and 18, the count utilization device 13 and the indicator 21, may be switched in and out of the circuit by applying and cutting off enabling voltages to these components, for example as shown in FIG. 2. In FIG 2, contacts 38, 46, 40, 48, 50, 52, 54, 56 and 58, are replaced by permanent direct connections, and switching of the components in and out of the circuit is effected by applying or cutting off enabling voltage from a source (not shown) connected to a terminal 70. The enabling voltage may be a required anode voltage such as the B+ indicated, or it may be a bias voltage, or any other voltage that may be applied to enable the components, and have the opposite effect when the voltage is cut off from the components.

In the normal mode, B+ is applied through closed contacts 42 to the source 12 of data pulses and to the count utilization circuit 13 to enable these components. During this mode, the enabling voltage is cut off from the source 18 of test pulses and from the indicator 21 because of the open contacts 34. During the check mode, contacts 42 are opened thereby disabling source 12 and utilization circuit 13, while contacts 34 are closed to apply the enabling voltage to source 18 and the one shot 23 of the indicator 21. The rest of the circuit in FIG. 2 operates in the same manner as that of FIG. 1.

The techniques of enabling and disabling circuits by application and cut off of enabling voltages are well-known and need no further explanation. For example, a circuit may be enabled and disabled by applying or cutting off either the anode B+ voltage or requisite grid bias voltages to a vacuum tube in the circuit. Equivalent techniques for enabling transistor circuits by applying or cutting off collector, emitter or base voltages are also well-known and do not require further explanation.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a system employing two counters in a desired circuit configuration, and wherein each counter includes at least $n$ stages, check means for checking the counters comprising a comparator, means for applying the $n$th stage outputs of the counters to respective inputs of the comparator, said comparator providing a distinctive output in response to unlike signals from the $n$th-stage outputs of the counters, switch means for disconnecting said counters from said circuit configuration and for connecting the signal inputs of said counters together, and means for applying a series of pulses to the commonly connected inputs of the counters.

2. In a system employing first and second $n$-stage counters in a desired circuit configuration, check means for checking the counters comprising a comparator, means for applying only the $n$th stage outputs of the counters to respective inputs of the comparator, said comparator providing a distinctive output in response to unlike signals from the $n$th-stage outputs of the counters, first switch means for disconnecting said counters from said circuit configuration, second switch means for connecting the signal inputs of said counters together, and means for applying a series of pulses to the commonly connected inputs of the counters.

3. Counter apparatus comprising a two-mode system including two like capacity counter sections, an input terminal for receiving pulses, a comparator which provides a distinctive output in response to unlike signals applied to its respective inputs, means for applying like capacity outputs of the respective counter sections to the respective inputs of said comparator, and means including switch means for selectively operating said system in either one of two modes, in one mode said counter sections being connected in cascade to said input terminal so that one counter section counts the overflow of the other counter section, in the other mode said cascade connection being open and said input terminal being connected to the inputs of both counter sections.

4. In a system wherein counts of data pulses are employed in a utilization circuit and which includes a $2n$-stage counter with first and second $n$-stage sections connected in series and a source of data pulses normally connected to supply data pulses to the input of the first counter section, a comparator for comparing signals supplied to two inputs thereof and for providing different outputs when the signals to its two inputs are respectively alike and unlike, means for connecting the $n$th-stage outputs of said counter sections to said respective inputs of the comparator, switch means which in one mode connects the two counter sections in series for normal operation in the system and in a second mode opens the series connection and couples the inputs of said counter sections together, and means jointly operative with said switch means for discontinuing the supply of data pulses to the input of the first counter when the switch means is in second mode and for supplying test pulses to the commonly connected inputs of the counters when the switch means is in the second mode.

5. In a system wherein counts of data pulses are employed in a utilization circuit and which includes first and second counters connected in series and a source of data pulses normally connected to supply data pulses to the input of the first counter, a comparator for comparing signals supplied to two inputs thereof and for providing different outputs when the signals to its two inputs are respectively alike and unlike, means for connecting the outputs of like capacity portions of said counters to said respective inputs of the comparator, switch means which in one mode connects the two counters in series so that only the overflow of the first counter actuates the second counter and in a second mode opens the series connection and couples the inputs of said counters together, and means jointly operative with said switch means for discontinuing the supply of data pulses to the input of the first counter when the switch means is in the second mode and for supplying test pulses to the commonly connected inputs of the counters when the switch means is in the second mode.

6. A system wherein data pulse count is employed in a utilization circuit, said system comprising an input terminal, a source of data pulses, a source of test pulses, first switch means which in one mode effectively connects said data pulse source to said input terminal and effectively disconnects the test pulse source from the terminal and in a second mode effectively connects the test pulse source to the terminal and effectively disconnects the data pulse source from the terminal, first and second counters, means for connecting said terminals to the input of the first counter, and second switch means which in one mode connects said counters in series so that only the overflow of the first counter actuates the second counter and in a second mode opens said series connection and couples the inputs of the counters together whereby the inputs of both counters are coupled to said input terminal, said second switch means being jointly operative with said first switch means.

7. A system wherein data pulse count is employed in a utilization circuit, said system comprising an input terminal, a source of data pulses, a source of test pulses, first switch means which in one mode effectively connects said data pulse source to said input terminal and effectively disconnects the test pulse source from the terminal and in a second mode effectively connects the test pulse source to the terminal and effectively disconnects the data pulse source from the terminal, first and second counters, means for connecting said terminal to the input of the first counter, second switch means which in one mode connects said counters in series so that only the overflow from the first counter actuates the second counter and in a second mode opens said series connection and couples the inputs of the counters together whereby the inputs of both counters are coupled to said input terminal, both said switch means being synchronized for effecting said one modes together and for effecting said second modes together.

8. In a system including first and second like capacity counters connected in series so that only the overflow of the first counter actuates the second counter, the combination therewith of check means for checking said counters, said check means comprising: a source of pulses, a comparator for providing a distinctive output in response to the receipt of unlike signals at respective input terminals thereof, means for connecting the outputs of said counters to the respective inputs of the comparator, means for opening said series connection between the counters, and means for effectively connecting the output of said pulse source to the inputs of said counters.

9. In a system including a $2n$-stage counter with first and second $n$-stage sections connected in series, the combination therewith of check means for checking said counter, said check means comprising: a source of pulses, a comparator for providing a distinctive output in response to the receipt of unlike signals at respective input terminals thereof, means for connecting the $n$th-stage outputs of said sections to the respective inputs of the comparator, means for opening said series connection between the counter sections, and means for effectively connecting the output of said pulse source to the inputs of said counter sections, the last two means being ganged for concurrent operation.

10. In a system involving the utilization of counts of data pulses, and wherein a counter has first and second like capacity sections connected in series in normal operation for receiving the data pulses, a checking means for checking said counter comprising: a comparator for producing a distinctive output in response to the receipt of unlike signals at respective input terminals thereof, a source of pulses, means for connecting the output of said source of pulses to the input of said first counter section, means for connecting the outputs of the respective counter sections to respective input terminals of the comparator, and switch means for opening said series connection between said counter sections and for connecting the output of said source of pulses to the input of said second counter section.

11. A system utilizing data pulse count, comprising a counter having two like capacity sections, a utilization circuit responsive to the output of said counter, a comparator which has different output conditions in response to equal or unequal conditions at two inputs thereof, means for applying the outputs of said respective counter sections to said respective inputs of the comparator, and switch means which in one mode connects the inputs of said counter sections together and disconnects the counter sections from said utilization circuit, and in another mode disjoins the inputs of the counter sections and connects said sections to said utilization circuit.

References Cited in the file of this patent
UNITED STATES PATENTS

| | | |
|---|---|---|
| 2,854,653 | Lubkin | Sept. 30, 1958 |
| 2,919,854 | Singman | Jan. 5, 1960 |